United States Patent [19]

Shipman

[11] 4,286,755

[45] Sep. 1, 1981

[54] VALVE FOR A SANDBLASTING DEVICE

[75] Inventor: Ronald L. Shipman, Cape Girardeau County, Mo.

[73] Assignee: Lenco, Inc., Jackson, Mo.

[21] Appl. No.: 84,732

[22] Filed: Oct. 15, 1979

[51] Int. Cl.³ .............................................. B05B 9/08
[52] U.S. Cl. .................................. 239/530; 239/576; 239/586
[58] Field of Search ................ 239/530, 569, 576, 586

[56] References Cited

U.S. PATENT DOCUMENTS

| 2,300,679 | 11/1942 | Klein | 239/576 |
| 3,194,501 | 7/1965 | Cape | 239/576 X |
| 3,661,327 | 5/1972 | Adamson | 239/569 |
| 3,754,709 | 8/1973 | Laatsch | 239/530 |

FOREIGN PATENT DOCUMENTS 37314 10/1967 Finland .................................... 239/576

Primary Examiner—Richard A. Schacher
Attorney, Agent, or Firm—Haverstock, Garrett & Roberts

[57] ABSTRACT

A valve for use on a sandblasting device to control the flow of an abrasive media expelled under pressure including a tubular housing having first and second end portions and a passageway extending therebetween, the housing having a transverse opening therethrough at an intermediate location therealong intersecting the passageway, a connecting member associated with the first end portion for attaching the housing to a sandblasting device, a nozzle guard assembly having a connection associated therewith for cooperatively engaging with the second housing end portion, the nozzle guard assembly having a passageway therethrough, a nozzle element positioned in the passageway in the guard assembly communicating with the passageway in the housing structure for controlling the flow therethrough, a flexible conduit member positioned in the housing passageway and extending therein between the first and second end portions, and an operator assembly mounted on the housing structure for controlling the flow through the flexible conduit member, the operator assembly including a plunger member extending through and movable in the housing opening and into engagement with the conduit member to compress the member into a closed position, and an operator member for moving the plunger member in opposition to the yieldable member to open the conduit member and permit flow therethrough.

16 Claims, 6 Drawing Figures

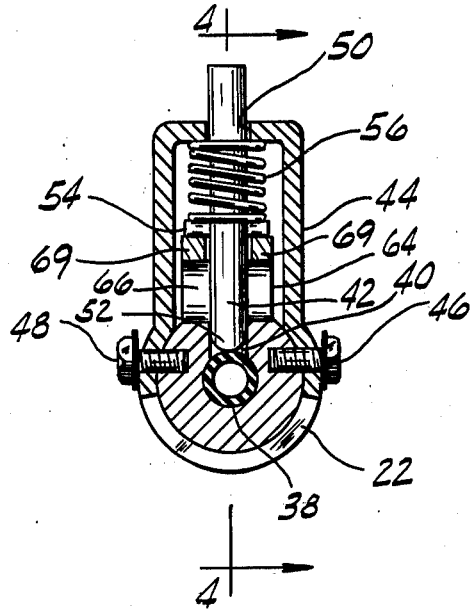
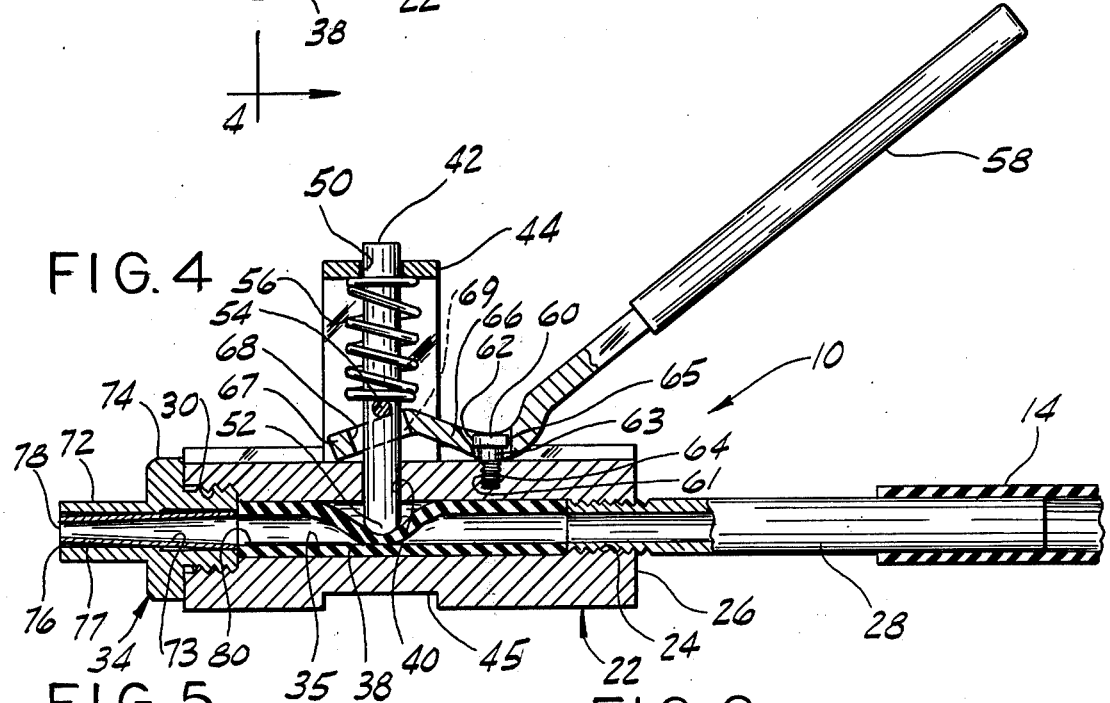
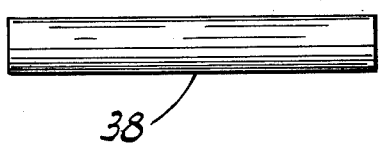
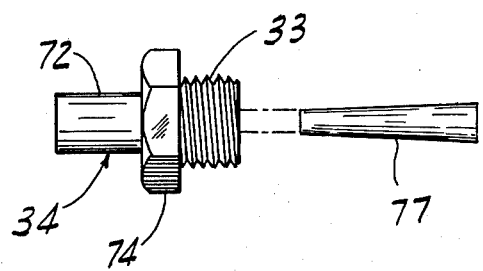

VALVE FOR A SANDBLASTING DEVICE

Many different kinds of pinch tube type valve constructions are known and have been employed for use in controlling the flow of a media associated with sandblasting or like operations. All such devices suffer from certain disadvantages and shortcomings including being costly and time consuming to construct and maintain. Devices such as the present device overcome these disadvantages and shortcomings and are especially useful in situations where it is necessary to control the flow of materials, including abrasive materials such as sand, expelled under pressure at high velocity, and where it is desirable to be able to quickly, expeditiously and at relatively low cost replace the parts that are most prone to wear such as the flexible conduit valve member and the nozzle.

The known prior art devices include a variety of pinch tube valve mechanisms adapted for use in controlling the flow of materials that are expelled under pressure, see for examples the constructions shown in Jordan U.S. Pat. No. 2,167,952; Cokeley et al U.S. Pat. No. 3,570,803; and Basel et al U.S. Pat. No. 3,976,277. The known constructions for the most part are characterized by complicated and cumbersome valve mechanisms utilized for selectively controlling the flow of a media through a flexible collapsible conduit which is integral with the main supply conduit or otherwise attached or housed in an awkward, bulky manner. Although the pinch tube type valves disclosed in the above-identified patents have attempted to improve the capability of handling the flow of abrasive materials expelled at high velocities, many disadvantages and shortcomings still exist. One principal problem with the known devices is to prevent wear to the expensive valve parts while maintaining reasonable longevity therefor and easy replacement of relatively inexpensive wear parts. Prior art constructions do not provide easy maintenance and replacement of inexpensive parts and are relatively expensive to maintain and repair. The known devices are also relatively large, bulky and cumbersome, awkward and difficult to hold and operate. This also affects the accuracy with which the known devices can be controlled and makes them difficult to store and transport. Furthermore, no known device has a nozzle guard assembly threadably attachable to the valve body structure and adaptable to accomodate replaceable nozzle elements that can be selected for use depending on the type of work to be done taking into account the velocity, pressure, density, and other characteristics of the abrasive flow. For these and other reasons, the known constructions have enjoyed limited usefulness.

The present construction overcomes these and other shortcomings and disadvantages of known valve devices including the pinch valves disclosed in the named patents, and teaches the construction and operation of a relatively simple construction both structurally and operationally which is also relatively inexpensive to make, use and repair. The present device is also easy to install on a sandblasting unit and increases the versatility and flexibility of such devices.

The present valve construction includes a tubular body portion which has means at one end for connecting to a tubular member which in turn is connected to the outlet of a sandblasting device. The opposite end of the tubular body portion cooperates with a removable adapter nozzle guard assembly in which a suitable nozzle element is positioned depending on the job to be sandblasted. Also of special importance to the present construction is the provision of an open ended flexible conduit member which can be easily installed and replaced in the valve body and which is the valve portion of the subject device which is compressed to constrict and where non-abrasive media are used to meter the flow therethrough. One side of the tubular body portion at an intermediate location has an opening therethrough which movably receives a plunger member that has an end that engages the flexible conduit and is used to control passage therethrough and to meter the flow in cases where non-abrasive substances such as water, air, and the like are to be expelled. Also important is the fact that the plunger member is normally biased in a direction in the body opening to pinch and close the conduit member when the device is not in use. An operator member is pivotally mounted on the tubular valve body and when operated moves the plunger member outwardly in opposition to the means that bias the plunger member closed to permit flow through the conduit member. This enables the operator to accurately meter the flow starting with zero flow and increasing the flow gradually, as desired. It is not generally desirable to meter the flow of abrasive materials such as sand as this substantially exposes the points of wear on the inner surface of the flexible conduit member and substantially reduces the useful life thereof. However, the present valve construction can be effectively used to meter non-abrasive media such as air, water, and certain other liquids. It is also important to the present valve construction that the valve means are normally closed when inoperative so that there will be no output blast of sand or other medium and therefore there will be no waste of materials and the device will be safe to use. Although it is anticipated that the present device will primarily be used with sandblasting equipment, it can also be used with other blasting or like devices where materials are to be expelled under pressure. Typical other applications include use with heavy duty high-pressure air lines, certain liquid dispensing applications, use in conjunction with corrosive fluids, and use in other similar pressurized flow applications.

It is a principal object of the present invention to provide a valve for sandblasting operations capable of accurately handling and controlling abrasive and other materials while maintaining low initial cost, long life for the more expensive valve parts, ease of critical parts replacement, and use of relatively inexpensive replacement wear parts.

Another object is to provide a normally closed valve for sandblasting devices having a relatively simple operation mechanism for use in controlling the opening and closing of the valve and the flow therethrough.

Another object is to provide a normally closed valve capable of handling and metering non-abrasive media starting with zero flow and increasing the flow gradually, as desired.

Another object is to provide a normally closed valve which is easily adaptable for use on various blasting type devices especially where it is desired to accurately control the flow of a medium expelled under pressure.

Another object is to provide a pinch tube type valve which remains in a normally closed position when the associated blasting equipment is not being used.

Another object is to provide a normally closed valve which can be easily and quickly attached to and removed from blasting type equipment.

Another object is to provide a relatively inexpensive valve which is durable and requires relatively little maintenance.

Another object is to provide a valve structure which utilizes a relatively inexpensive short flexible conduit member that can be easily collapsed or compressed to constrict or meter the flow of materials therethrough.

Another object is to provide a normally closed valve which utilizes a relatively short and easily replaceable flexible conduit member positioned and supported in a valve housing, which conduit member isolates the more expensive valve components from the flow thereby substantially prolonging their life.

Another object is to provide a normally closed valve wherein the flexible conduit member can be easily rotated and inverted so as to expose a new conduit surface to the point of most wear, thus substantially increasing the life expectancy of the conduit member.

Another object is to provide a valve assembly which includes a relatively inexpensive replaceable nozzle element.

Another object is to provide a sandblaster control valve which includes an easily replaceable nozzle element which can be selected to have different size passages therethrough depending on the work to be done.

Another object is to provide a valve assembly for use in conjunction with blasting type equipment which is relatively easy to assemble and disassemble for inspection, repair and maintenance.

Another object is to provide a normally closed valve which is relatively easy to accurately control starting from a normally closed condition and increasing the flow therefrom as desired.

Another object is to provide a sandblaster valve in which the wear elements can be quickly and easily replaced.

Another object is to improve the efficiency and accuracy of sandblasting operations.

Another object is to teach the construction and operation of a relatively simple, versatile and easy to operate valve for use in controlling the flow of an abrasive material associated with blasting type equipment.

These and other objects and advantages of the present invention will become apparent to those skilled in the art after considering the following detailed specification in conjunction with the accompanying drawings, wherein:

FIG. 3 is a cross-sectional view taken on line 3—3 of FIG. 2, but showing the valve in an open condition;

FIG. 4 is a cross-sectional view taken on line 4—4 of FIG. 3, but showing the valve in closed condition;

FIG. 5 is a side elevational view of a replaceable flexible conduit member for use in the valve shown in FIG. 1–4; and FIG. 6 is an exploded side elevational view of the nozzle guard assembly portion of the valve showing a replaceable tapered nozzle element.

Figure 1:
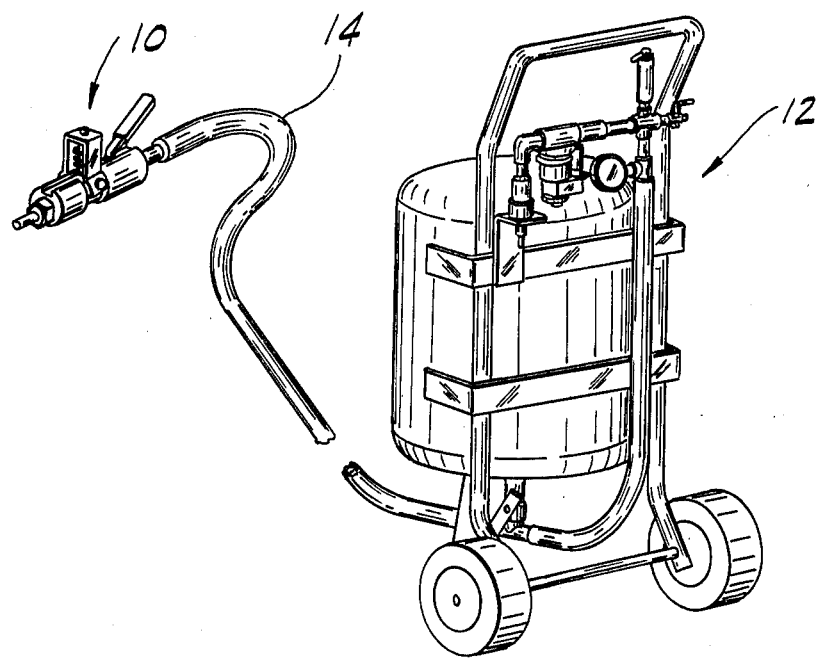
FIG. 1 is a perspective view of a sandblasting device equipped with valve means constructed according to the present invention.

Referring to the drawings more particularly by reference numbers, number 10 refers generally to a normally closed valve for a sandblasting device constructed according to the present invention. The valve 10, as shown in FIG. 1, is installed for use with a sandblasting device 12 and is connected to the outlet end portion of hose section 14. Although it is anticipated that the subject valve will primarily be used with sandblasting equipment, the valve 10 is easily adaptable for use with many type devices where it is desired to control the flow of a material expelled under pressure at high velocities. The valve 10 can be easily and quickly attached to and removed from the hose 14 which is representative of similar outlet means associated with various type blasting devices. When an operator opens the valve 10 by manually operating a simple operator member which will be described later, a blast of sand or other material is expelled for directing against an object or workpiece.

Figure 2:
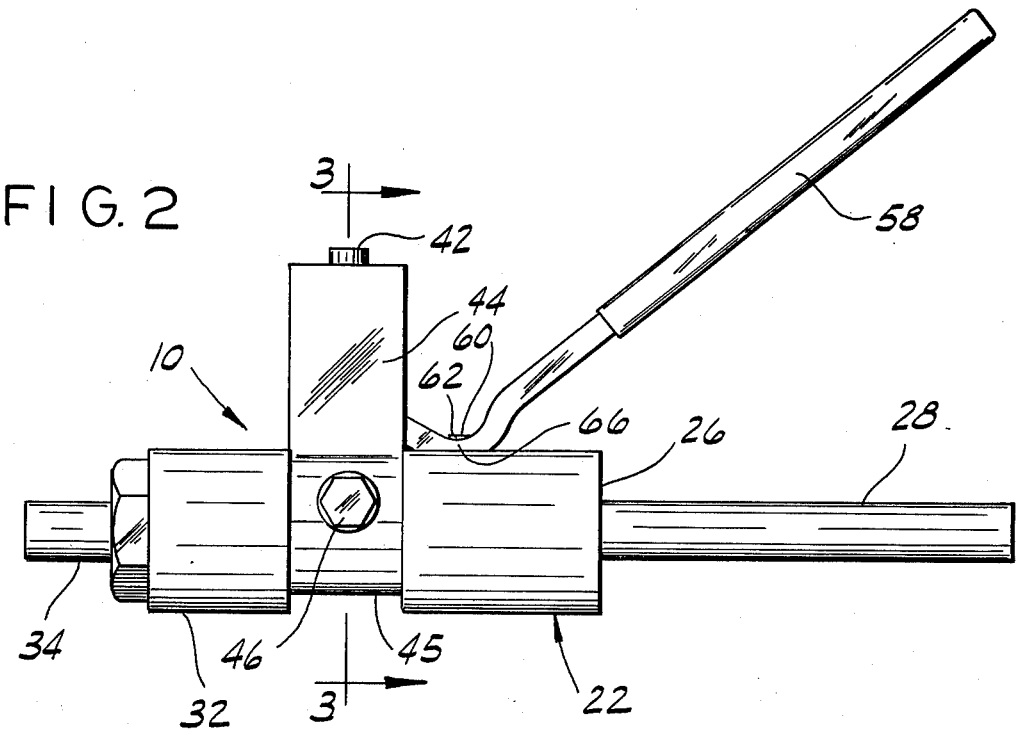
FIG. 2 is a side elevational view of the valve means per se of FIG. 1.

Referring to FIG. 2, the valve 10 includes a tubular body portion 22 having a threaded bore 24 (FIG. 4) at inlet end portion 26 for threadedly receiving a tubular fitting member 28 which cooperates with the outlet end of the hose 14. The opposite end 32 of the body 22 also has a threaded bore 30 for receiving threaded portion 33 of a nozzle guard assembly 34. Even though the connection means are shown as threaded means for ease of connection and replacement of parts, other suitable connection means including bayonet type connection means (not shown) could also be used.

The valve body has a cylindrical inner chamber 35 which extends between the opposite threaded end bores 24 and 30, and the chamber 35 receives an open ended tubular conduit member 38 as clearly shown in FIGS. 3 and 4. The conduit member 38 is important to the present device and is formed of a relatively flexible substance such as rubber or plastic which can be easily collapsed or compressed to constrict or meter the flow therethrough, but is also able to return to its original tubular shape without permanently distorting. The flexible conduit member 38 preferrably is constructed of a relatively low durometer gum rubber and effectively isolates certain of the metallic valve components from the abrasive flow, so that they do not wear, while itself being capable of handling such flow for long periods without breakdown or damage. The conduit member 38 is also preferrably short in length and can be easily installed, removed and replaced with minimum of cost and trouble. In addition, the flexible member 38 can be easily rotated and inverted in chamber 35 so as to expose new points of wear on the inner surface thereof to the flow therethrough and thus substantially increase the useful life of each such members. To replace the member 38, the operator need only disconnect the nozzle guard assembly 34 from the valve body or housing 22 in order to gain access to conduit member 38. It will also be necessary to actuate the valve when disconnected in order to be able to remove and replace the member 38. Although it is preferred that member 38 be replaced by removing nozzle guard assembly 34, it may also be possible in certain situations to disconnect hose fitting 28 from housing 22 in order to gain access thereto although this is usually not preferred.

One side of the tubular body portion 22 at an intermediate location therealong has an opening or aperture 40 formed therethrough as shown in FIGS. 3 and 4. The aperture 40 movably receives a plunger 42 which is mounted for radial movement therein by means which include a spring housing 44. The spring housing 44 is U-shaped as shown in FIG. 3 and is mounted in a groove 45 in the tubular valve body 22, being attached to the housing by suitable threaded members 46 and 48.

The plunger member 42 extends through an opening 50 in the U-shaped housing 44, and it has a rounded or contoured end portion 52 which engages the flexible conduit member 38 at an intermediate location therealong and substantially perpendicularly to the flow therethrough. The plunger 42 has a pin member 54 which extends transversely therethrough and therefrom at an intermediate location therealong, and a coil spring member 56 is positioned on the plunger 42 and extends between the transverse pin member 54 and the spring housing 44 to urge the plunger 42 into the aperture 40 in the tubular body portion 22 and against the conduit 38 so that the rounded end portion 52 thereof bears against the conduit member 38 at an intermediate location and compresses it into a closed condition thereby closing the valve 10 as shown in FIG. 4. The spring member 56 maintains the plunger 42 in its closed position at all times except when the valve is being used so that no flow of abrasive material can escape or be expelled through the nozzle guard assembly 34. This is important for safety reasons and also to prevent waste when the device is not being used, and this condition is maintained regardless of whether the sandblaster is turned on. It is important to the present constructions that the subject valve remain in its normally closed position except when it is being used to sandblast.

Referring again to FIGS. 2 and 4, a handle member 58 is shown pivotally mounted on the tubular valve body 22 by a suitable threaded member 60 (FIG. 4) which has an enlarged head portion 62, a cylindrical shank portion 63, and a threaded portion 64 which co-operates with a threaded bore 61 in the body 22. The threaded member 60 extends through an elongated opening 65 formed in a curved handle portion 66. Other suitable connection means may also be used. The handle or operator member 58 includes an end portion 67 which has an oversized aperture 68 therethrough which is positioned around the plunger 42. The handle also has spaced portions 69 located on opposite sides of the aperture 68 which engage respective opposite ends of the pin member 54. This means that when the handle member 58 is pushed downwardly towards the tubular valve body 22 as shown in FIG. 4, the plunger 42 will be moved upwardly against the biasing action of the spring 56 as shown in FIG. 3, thereby releasing pressure on the flexible conduit member 38 so that some of the abrasive medium will be able to flow through the member 38 to and through the nozzle guard assembly 34 and against the work. It is important to the present valve construction that operation of the handle 58 open the valve quickly and fully when used with a sandblaster to minimize exposure of that portion of the member 38 where it contacts the plunger to the blast because this is the portion that undergoes the most wear. When used with a non-abrasive substance, however, more gradual opening of the valve can be used to control and meter the flow. The present valve construction is especially designed to prevent flow regardless of the material until the handle 58 is manually actuated. In its inoperative condition, as stated, the spring member 56 continuously biases the head end portion 52 of the plunger 42 against the conduit member 38 compressing it into a pinched closed condition. Furthermore, if during operation of the valve the operator's hand should slip off the handle 58 or he should otherwise lose control so that the handle is released the valve will close. This is an important advantage. The oversize of the handle openings 65 and 68 relative to the associated members 63 and 42, respectively, minimizes friction between the various parts and reduces the possibility for binding.

FIG. 5 shows the simplicity of the construction of replaceable flexible conduit member 38 which is one of the only parts of the present device that normally needs to be replaced from time to time. The conduit member 38 can be constructed of any suitable material which is preferrably relatively strong and resistant to wear caused by the material to which it is exposed such as sand or other particles that move through it, and it should be flexible and relatively easily collapsed or compressed in order to constrict the flow of materials therethrough. The member 38 should also be able to relatively easily and quickly regain its normal open tubular condition whenever the pressure of the plunger 42 is removed therefrom. In addition, the useful life of each such member 38 can be effectively increased by periodically rotating and inverting member 38 within chamber 35 so as to expose new areas to the plunger member 42 and to the flow of materials therethrough. The selection of the material composition of the flexible conduit member 38 may also depend to some extent on the type of abrasive medium that is to pass through it. In any event, the member 38 is an expendable part which will need to be replaced occasionally, and the ease and inexpensiveness with which this can be accomplished with the present construction is an important advantage.

FIG. 6 shows the details of the nozzle guard assembly 34 which is threadedly engageable with the threaded bore 30 in the outlet end of the tubular valve body 22. The assembly 34 includes a threaded inlet portion 33, an outlet portion 72 which is shown having a cylindrical outer surface, and a hexagonal portion 74 which can cooperatively receive a wrench used for tightening it in place on the tubular body 22. The assembly 34 also has an internally tapered or stepped bore 76 that becomes smaller towards the outlet end thereof. A replaceable nozzle element 77 is positioned in the bore 76 and has a bore 73 therethrough through which the material to be expelled passes as it is expelled from the subject device and moves against an object to be blasted. The nozzle element 77 is dimensioned to be insertable in tapered bore 76 in the assembly 34 so that when the assembly is threadedly attached to the valve member 22 the larger end of the element 77 abuts and is sealably compressed against the adjacent end of the flexible tube 38 to form a seal therebetween. In this position passage 80 through the tube 38 registers with the passage or bore 73 through the element 77. Thus a continuous passageway is formed through the valve, which passageway also prevents the abrasive particles from coming in contact with and damaging the more permanent parts of the valve. Although threaded connecting means between the nozzle assembly 34 and the housing 22 are shown other suitable connecting means including bayonet type connecting means could also be used. The important thing is that the tapered nozzle element 77, like the tubular member 38, is a replaceable part, and it is expected that periodically these members will need to be replaced.

It should also be noted that the subject valve can be supplied with nozzle elements that have the same external size and shape, but which have different diameter passages such as the passage 73 therethrough. This enables an operator to select different nozzle elements for different jobs. The advantages of this are readily apparent. For example, as the diameter to the passage 73 is increased without otherwise changing the input from the sandblaster or other pressure source, it is expected that the velocity of the discharged flow will decrease but that a larger area will be blasted and vice versa. Some additional control of the discharge can also be obtained by tapering the passage 73 from end to end, the smaller diameter end being at the outlet end. Also, the life of the nozzle element 77 will vary depending on the selection of the material composition thereto, and the type of medium that is to pass therethrough. When sand is used as the abrasive, the effective nozzle element life can vary from a few hours up to approximately 300 hours or more depending upon whether the nozzle element is made of steel, ceramic, cast iron, tungsten carbide, or some other material. Tungsten carbide usually has the longest longevity. However, as nozzle life increases so does cost, and a comparison of the cost factor verses the effective life must be taken into consideration in selecting a suitable nozzle material. Even so, the ease with which the nozzle element can be installed and replaced greatly increases the flexibility and versatility of valve 10 and enables an operator to select suitable wear elements depending on the overall circumstances. Furthermore, because of the ease of replaceability of the members 38 and 77 it can be expected that little or no wear will take place to most of the valve parts and this is an important advantage. The simplicity, compactness, durability and controllability of the subject valve greatly increases its usefulness and effectiveness for use in sandblasting and other similar type operations. Furthermore its unique design and ease of replacing critical wear parts are important factors.

Thus there has been shown and described a novel versatile valve construction for use with flow control devices such as sandblasting devices, which valve construction fulfills all of the objects and advantages sought therefor. Many changes, modifications, variations, and other uses and applications of the present valve construction will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A valve for use on a blasting and like device comprising a housing structure having first and second end portions and a passageway extending therebetween, said housing structure having an opening therethrough intersecting said passageway at an intermediate location therealong, means associated with the first end portion for operatively attaching said housing structure to a source of blasting material, a nozzle guard assembly having means associated therewith for cooperatively engaging the second housing structure end portion, said nozzle guard assembly having a passageway therethrough which communicates with the passageway in the housing structure, a nozzle element removably insertable in the passageway in the guard assembly communicating with the passageway in said housing structure through which and from which a blasting material can be expelled, an open ended flexible conduit member positioned in the passageway in said housing structure and extending therein between said first and second end portions, means mounted on said housing structure for controlling the flow through said flexible conduit member, said last named means including plunger means extending through said housing opening into engagement with said flexible conduit member at an intermediate location therealong, means biasing said plunger means against said flexible conduit member to maintain it in a closed condition, operating means on the housing structure operatively engageable with said plunger means, said operating means being movable to an operating position moving the plunger means outwardly in the housing opening in opposition to said biasing means to permit communication through the flexible conduit member, said flexible conduit member being removable from the passageway for replacement when the operating means are in the operative position.

2. The valve of claim 1 wherein said means for attaching said valve to a source of blasting material includes a tubular member having a passageway extending therethrough and means connecting one end of said tubular member to said housing structure, and means connecting the opposite end thereof to a source of blasting material.

3. The valve of claim 1 wherein said nozzle element is tubular having a tapered passageway extending therethrough.

4. The valve of claim 1 wherein said plunger means has a contoured end portion similar to the contour of the passageway in the housing structure.

5. The valve of claim 1 wherein said operating means include an operator member and means associated therewith pivotally mounting said operator member on the housing structure, said pivotal mounting means including a member threadedly engageable with the housing structure and an oversized opening through the operator member through which the threaded member extends.

6. The valve of claim 5 wherein said operator member has a second opening therethrough through which the plunger means extend, said second opening being oversized as compared to the plunger means.

7. The valve defined in claim 1 wherein said nozzle element resiliently abuts said flexible conduit member.

8. A valve for use with blasting devices comprising a valve housing having a chamber therein, an inlet port and an outlet port in the housing in spaced and opposed relation on opposite sides of the chamber, pressurized source of blasting material, a nozzle assembly attached to the housing outlet port, said nozzle assembly having a passagway therethrough, a nozzle element removably mounted in the passageway, said nozzle element having a passage of predetermined size therethrough through which and from which a stream of blasting material passes, a flexible liner positioned in the housing chamber and extending therein between the inlet and outlet ports, said liner having a passage therethrough which communicates at one end with the source of pressurized blasting material and at the opposite end with the passage through the nozzle element, said liner being removable from said housing chamber when the nozzle assembly is detached therefrom, means mounted on the housing for movement into engagement with the flexible liner at an intermediate location between the inlet and outlet ports to control flow therethrough, said last named means including an opening in the housing and a plunger member movably supported in the housing opening, means biasing said plunger member in the housing opening toward the liner normally compressing said liner and preventing communication therethrough, and operator means pivotally mounted on the housing, said operator means including a member engageable with the plunger member and movable on the housing to control the positions of the plunger member in the housing opening.

9. The valve defined in claim 8 wherein the nozzle element and the liner are in abutment.

10. The valve defined in claim 8 wherein the nozzle assembly has a tapered inner surface and the nozzle element has a tapered outer surface in surface-to-surface contact with the tapered inner surface of the nozzle assembly.

11. The valve defined in claim 8 wherein the housing has a groove formed in the outer surface thereof, and the operator member has a portion thereof located in said housing groove, said operator member having one end portion thereof forming a handle and having an opposite end portion operatively engageable with the plunger member.

12. The valve defined in claim 8 wherein the liner is tubular in shape and is formed of a resilient material.

13. A valve for use on a blasting device, said valve comprising a cylindrical housing structure having first and second end portions and a passageway extending therebetween, said housing structure having an opening therethrough at an intermediate location therealong intersecting said passageway, connection means associated with said first end portion and extending therefrom for receiving and attaching to an outlet hose associated with a blasting type device, a nozzle guard assembly having means associated therewith for cooperatively engaging the second end portion of said housing structure, said nozzle guard assembly having a passageway extending therethrough, a nozzle element including a tubular member removably positioned in the passageway in said nozzle guard assembly and communicating with the passageway in said housing structure, a flexible member removably positioned in the passageway in said housing structure and extending therein between said first and second end portions, said flexible member having a passageway therethrough which communicates at one end with the outlet hose associated with a blasting device and at the opposite end abuts said nozzle element, means mounted on said housing structure for controlling flow through said flexible member including a plunger slidably positioned in said housing opening for movement therein, means on the housing structure biasing said plunger into engagement with said flexible member at an intermediate location therealong compressing said member into a normally closed condition, and operator means on said housing structure operatively engageable with said plunger and movable to control and meter flow through the flexible member.

14. A valve for use on a blasting and like device comprising a housing structure having first and second end portions and a passageway extending therebetween, said housing structure having an opening therethrough intersecting said passageway at an intermediate location therealong, means associated with the first end portion for operatively attaching said housing structure to a source of blasting material, a nozzle guard assembly having means associated therewith for cooperatively engaging the second end portion of the housing structure, said nozzle guard assembly having a passageway therethrough which communicates with the passageway in the housing structure, a nozzle element in the passageway in the guard assembly communicating with the passageway in said housing structure through which and from which a blasting material can be expelled, an open ended flexible conduit member positioned in the passageway in said housing structure and extending therein between said first and second end portions, means mounted on said housing structure for controlling the flow through said flexible conduit member, said means including plunger means extending through said housing opening into engagement with said flexible conduit member at an intermediate location therealong, means biasing said plunger means against said flexible conduit member to maintain it in a closed condition, an operator member operatively engageable with said plunger means mounted for movement on the housing structure, operation of said operator member moving the plunger means outwardly in the housing opening in opposition to the biasing means to permit communication through the flexible conduit member, and means pivotally mounting the operator member on the housing structure, said pivotal mounting means including a member threadedly engageable with the housing structure and an oversized opening through the operator member through which the threaded member extends.

15. The valve of claim 14 wherein said operator member has a second opening therethrough through which the plunger means extend, said second opening being oversized as compared to the plunger means.

16. A valve for use with blasting devices comprising a valve housing having a chamber therein, an inlet port and an outlet port in the housing in spaced and opposed relation on opposite sides of the chamber, means associated with the inlet port for attaching to a pressurized source of blasting material, a nozzle assembly attached to the housing outlet port, said nozzle assembly having a passageway therethrough, a nozzle element positioned in the passageway of said nozzle assembly, said nozzle element having a passage of predetermined size therethrough through which and from which a stream of blasting material passes, a flexible liner positioned in the housing chamber and extending therein between the inlet and outlet ports, said liner having a passage therethrough which communicates at one end with the source of pressurized blasting material and at the opposite end with the nozzle element, means on the housing movable into engagement with the flexible liner at an intermediate location between the inlet and outlet ports to control flow therethrough, said last named means including a plunger member and means movably supporting the plunger member on said housing, said housing having an aperture therethrough through which the plunger member extends, means biasing said plunger member in the housing aperture toward the liner to normally compress said liner and prevent communication therethrough, a valve operator member pivotally mounted on the housing, said operator member having one end portion thereof forming a handle and an opposite end portion operatively engageable with the plunger member for moving the plunger member outwardly in the housing aperature to permit the liner to open and to allow communication therethrough between the inlet and outlet ports, and a groove formed in the outer surface of said housing for locating a portion of said operator member therein.

* * * * *